United States Patent [19]

Nakagoshi et al.

[11] 3,980,938

[45] Sept. 14, 1976

[54] SCALE CONTROL DEVICE FOR USE IN PROFILING MACHINE TOOL

[75] Inventors: Noboru Nakagoshi, Kyoto; Saburo Watanabe, Shimizu, both of Japan

[73] Assignee: Yoneda Tekkosho Ltd., Osaka, Japan

[22] Filed: Dec. 11, 1974

[21] Appl. No.: 531,666

[30] Foreign Application Priority Data

| Apr. 22, 1974 | Japan | 49-44452 |
|---|---|---|
| Apr. 22, 1974 | Japan | 49-44453 |

[52] U.S. Cl. ............................ 318/578; 318/675; 90/62 R
[51] Int. Cl.² ................................. G05B 19/36
[58] Field of Search .................. 318/657, 570, 571, 575-578, 675; 90/13.1, 13.2, 13.8, 62 R, 62 A

[56] References Cited
UNITED STATES PATENTS

| 3,391,392 | 7/1968 | Doyle | 318/576 |
|---|---|---|---|
| 3,457,484 | 7/1969 | Shimizu et al. | 318/578 |
| 3,573,546 | 4/1971 | Hemery | 318/578 |
| 3,711,717 | 1/1973 | Rich et al. | 250/202 |
| 3,878,761 | 4/1975 | Makowski | 318/578 |

*Primary Examiner*—Robert K. Schaefer
*Assistant Examiner*—John J. Feldhaus
*Attorney, Agent, or Firm*—James E. Nilles

[57] ABSTRACT

There is disclosed a scale control device for use in a profiling machine tool, which comprises: relative displacement detecting means detecting a relative displacement and a displacing direction of a tool head with respect to a work, thereby producing output signals including data of relative displacement and the direction of the displacement; feedback signal producing means receiving the output signals from the relative displacement detecting means and converting the output signals into feedback signals which have been frequency-divided at a pre-set desired ratio; and model drive mechanisms displacing a model relative to the work in a direction the same as or reverse to the moving direction of the tool head with respect to the work, in response to the feedback signals and in proportion to a relative displacement between the tool head and the work.

3 Claims, 3 Drawing Figures

SCALE CONTROL DEVICE FOR USE IN PROFILING MACHINE TOOL

BACKGROUND OF THE INVENTION

1. Field of the Invention

This invention relates to a scale control device for use in a profiling machine tool.

More particularly, the present invention relates to a profiling scale control device which is to be incorporated in a profiling machine tool, so as to facilitate the setting of a magnifying ratio or contracting ratio of a model to a desired value, for processing a work by the use of a profiling machine tool.

2. Prior Art

A profiling machine tool has been known in which a work is machined to a given magnification or contracting ratio. However, it is unknown to set a magnifying or contracting ratio close to 1. Stated otherwise, it is not yet practised to machine a work to a size slightly larger than or slightly smaller than a model. The reason is considered due to the fact that there is no technology capable of magnifying or contracting a model in size by several percent with the required precision. It is even more difficult that a mechanism is adjusted so as to be capable of setting a magnifying or contracting ratio to a desired value. For example, in order to adjust a magnifying or contracting mechanism in which a train of gears are employed to be capable of changing a magnifying or contracting ratio to a desired value, a complicated mechanism is required for re-setting a train of gears, with the accompanying troublesome procedures. Furthermore, another difficulty has been encounted with the magnifying or contracting mechanism using a train of gears in that it is impossible to continuously adjust the profiling scale.

SUMMARY OF THE INVENTION:

It is accordingly an object of the present invention to provide a profiling scale control device, in which a profiling scale may be continuously adjusted to a desired value by using a device simple in construction, i.e. by using a single machine without the necessity of a separate profiling machine and a processing machine.

Another object of the present invention is to provide a profiling scale setting device, in which a profiling scale may be set to different values for every controlling direction (for instance, in the three axial directions of X, Y and Z, which intersect with one another).

The profiling machine tool equipped with a scale control device according to the present invention, unlike the conventional like-machine tool, can be used for various purposes, which are exemplified in the following:

1. For manufacture of a metal mold:

A metal mold used for the casting of metal or used for the molding of plastic must be changed in size depending on a material of a product which is to be molded in a metal mold. Because the coefficient of expansion of a material to be molded varies, it is imperative that, in case of casting or molding, the degree of contraction resulting from the cooling be taken into consideration in determining the size of the metal mold to be used. For this reason, in production of a metal mold by the use of the conventional profiling machine tool, it is necessary to prepare a different model of a metal mold for every material to be molded or cast, depending upon the coefficient of expansion of the material to be used. According to the scale control device of the present invention, metal molds of different sizes, which are suited for respective materials different in expansion coefficient, may be produced from a single model of metal mold, presenting considerable economy, 2. For machining a work by changing a profiling scale for every profiling control direction:

According to the profiling scale control device of present invention, a profiling scale may be set to a different value either in an X-direction or in a Y-direction, so that a cylindrical model of a circular shape in cross-section may be used for machining a work to a cylindrical shape of an elliptic shape in cross-section. Considering the fact that the machining of a work by the use of a model of an elliptic shape in cross-section is extremely difficult, it will be obvious how useful is the present invention.

According to the present invention, in a profiling machine tool including a tracer head displaceable relative to a model; a tool head displaceable relative to a work; a stylus held by the tracer head and adapted to contact the model; a tool carried by the tool head and machining the work; and a profiling control means detecting the contact of the stylus with the model and controlling the position of the tool head relative to the work; there is provided a scale control device comprising: relative displacement detecting means detecting a relative displacement and a displacing direction of the tool head with respect to the work and producing outputs including data of relative displacement and the direction of displacement; feedback signal producing means receiving output signals from the relative displacement detecting means and converting the output signals into feedback signals which have been frequency-divided at a pre-set, desired ratio; and model drive mechanisms displacing the model relative to the work in a direction the same as or reverse to the moving direction of the tool head with respect to the work, in response to the feedback signals and in proportion to the relative displacement of the tool head to the work.

Description will hereunder be given to embodiments of the present invention, with reference to the accompanying drawings.

DESCRIPTION OF THE PREFERRED EMBODIMENT

Figure 1:
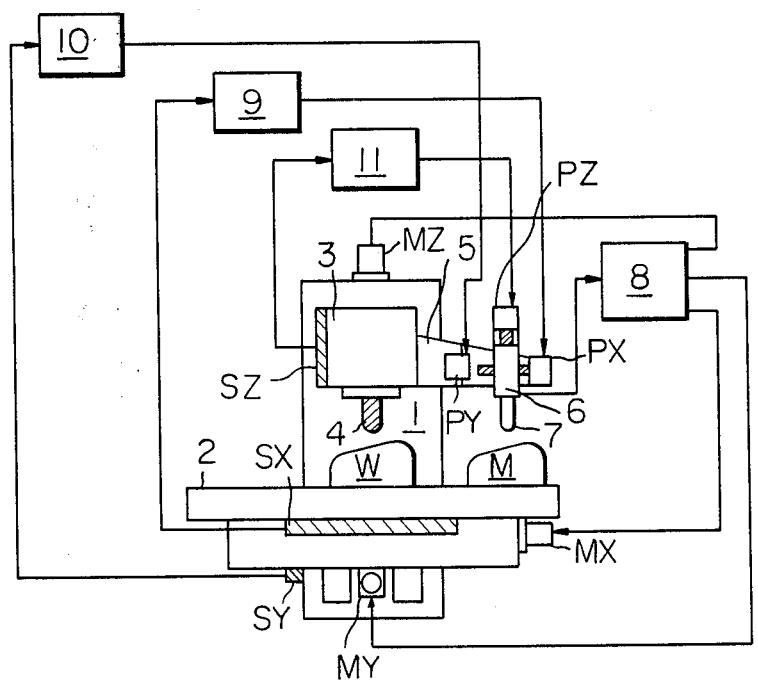
FIG. 1 is a diagram showing the outline of a profiling machine tool equipped with a scale control device of the present invention, according to a first embodiment.

Referring to FIG. 1 showing a first embodiment, shown at 1 is a body proper of a profiling machine tool, at 2 a table, on which a model M and a work W are rested, and which is movable in the two horizontal directions with respect to the body proper 1, i.e., both in the X-direction and in the Y-direction, at 3 a tool head movable in the vertical direction (in the Z-direction) with respect to the body proper 1, and at 4 a tool mounted on the tool head 3. Shown at 5 is a tracer head support member secured to the tool head 3, at 6 a tracer head carried by the tracer head support member 5, and at 7 a stylus held by the tracer head 6. Designated 8 is a means for producing profiling control signals for the table and tool head, the means producing profiling control signals for the control of the movement of the table either in the X-direction or in the Y-direction as well as producing profiling control signals for the control of the movement of the tool head in the Z-direction, in response to detecting signals generating when the stylus 7 contacts the model M. The profiling control signals for the table and tool head are transmitted to table driving servo-motors MX and MY and to a tool head driving servo-motor MZ, thereby shifting the tool 4 three-dimensionally with respect to the work W.

The construction described is in common with a profiling machine tool of the prior art. In such a construction, the work W is merely machined to the same size as the model M.

According to the present invention, in addition to the profiling machine tool exemplified in the above, there is provided a scale control device. The device is composed of; direct-acting type transducers SX, SY and SZ (for example, Induct-syn, or Magne-scale which is a product of Sony Corporation) disposed in respective profiling control directions X, Y and Z, these transducers detecting a relative displacement and a displacing direction of the tool head 3 with respect to the work W and converting such data into pulse signals; feedback signals producing means 9, 10 and 11, and tracer-head drive mechanisms PX, PY and PZ; the feedback signal producing means which frequency-divides the output signals produced from respective direct-acting type transducers to a pre-set, desired ratio and amplifying the signals thus divided to a power level sufficiently high to actuate the tracer-head driving mechanisms, and the tracer head driving mechanisms being composed, for example, of pulse motors and controlled according to the feedback signals thus obtained.

In the specification, the term to frequency-divide is used in a sense that a train of pulses of a certain frequency are divided into a train of pulses of a frequency presenting a single integer ratio to that of the aforesaid train of pulses.

Figure 2:
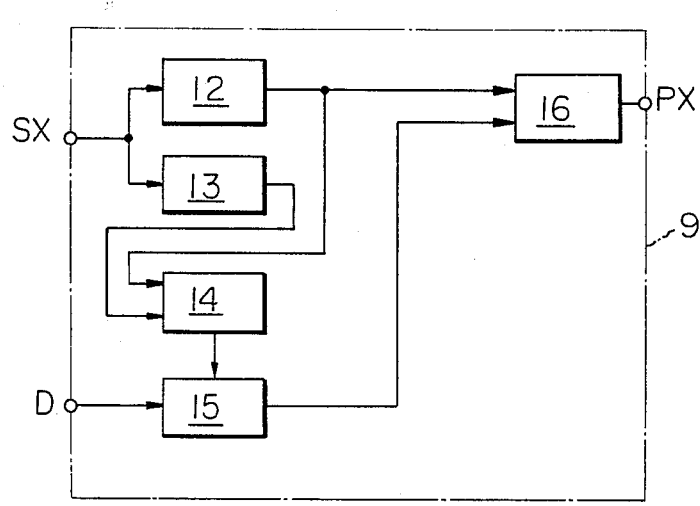
FIG. 2 is a block diagram illustrating a tracer head controlling means used for the scale control device of the first embodiment shown in FIG. 1.

FIG. 2 diagrammatically shows the construction of one of the feedback signal producing means of FIG. 1. The feedback signal producing means is composed of; a frequency-dividing unit consisting of a polarity discriminating circuit 12, a wave-form rectifying circuit 13, a reversible counter 14 and a comparator circuit 15, and a pulse motor drive unit 16.

In operation, the comparator circuit 15 is assumed to be set to a proper frequency-dividing ratio of N:1, for example, by the operation of a dial D. Meant by the frequency-dividing ratio of N:1 is to produce one pulse for the input pulses of $n$ numbers. It is a must that the train of input pulses fed from the direct-acting type transducer SX to the frequency-dividing unit include the data of displacement of the table 2 as well as the data as to whether the moving direction of the table is a positive direction or a negative direction. The requirement is satisfied with ease by employing the known polarity discriminating means using a pair of trains of pulses, whose phases are biased by 90° from each other. If a pair of trains of pulses from the direct-acting type transducer SX are fed to the polarity discriminating circuit 12, then the circuit 12 distinguishes whether the moving direction of the table 2 is a positive direction or a negative direction, based upon a relative phase between both trains of pulses, and feeds the data of moving direction of the table to the pulse motor drive unit 16 and reversible counter 14. At least one train of pulses of the pair of trains of pulses from the direct-acting type transducer SX is fed to the waveform rectifying circuit 13, where its wave form is rectified, and fed to the counter 14 to be counted. The number of pulses counted in the counter 14 is compared with the frequency-dividing ratio of N:1 pre-set in the comparator circuit, and whenever the count value in the counter 14 reaches a positive or negative value N, the comparator circuit feeds one pulse to the pulse motor drive unit 16, and at the same time, feeds a zero signal to the counter 14 so as to clear the count value in the counter 14 to zero, and thus, the counting may re-start. The pulse motor drive unit 16 amplifies the pulses coming from the comparator circuit 15 to a level sufficiently high to actuate the pulse motor and moves the tracer head drive mechanism, i.e., the pulse motor PX, in a positive direction or a negative direction, according to the polarity signals fed from the polarity distinction circuit 12. Stated otherwise, the pulses are fed back.

Assuming that a relative displacement between the work W and the tool is S and a frequency-dividing ratio is N:1, then the tracer head will be moved by S/N with respect to the tool, and a relative displacement of the tracer head to the model M is expressed by:

$$S \pm \frac{S}{N} = S(1 \pm \frac{1}{N})$$

In this case, a ratio of the work size $S_W$ to the model size $S_M$ is:

$$\frac{S_W}{S_M} = \frac{1}{1 \pm \frac{1}{N}}$$

Supposing the transducer SX produces one pulse for every displacement of 0.01 mm of the table 2 in the X direction, then 100 pulses will be fed to the feedback signal producing device 9 for a duration in which the table 2 is displaced by 1 mm leftwards (in the positive direction). The feedback signal producing device 9, if the frequency-dividing ratio is assumed to be 100:1, will feed one pulse to the pulse motor PX for that duration. If it is supposed that, according to that one pulse, the pulse motor PX can be displaced the tracer head 6 relative to the tool head 3 by 1 mm in the same direction as the moving direction of the table 2 with respect to the tool head 3, then displacement of the tracer head 6 relative to the model M will be 1 + 0.01. The displacement of 1 mm of the tool 4 with respect to the work W is smaller by approximately 1% than the displacement of 1.01 mm of the tracer head 6 relative to the model M. Thus, in this case, the work W will be machined to a shape approximately 1% smaller than the model M. If the direction of displacement of the tracer head 6 relative to the tool head 3 is reverse to the moving direction of the table 2, the work W will be machined to a size approximately 1% larger than the model M.

If the frequency-dividing ratios in respective comparator circuits (refer to FIG. 2) within respective feedback signal producing means 9, 10 and 11 are set to different values, a cylindrical member having an elliptic shape in cross-section may be formed by the use of a cylindrical model. Thus, the scale control device of the present invention increases the range of use of the profiling machine tool.

Figure 3:
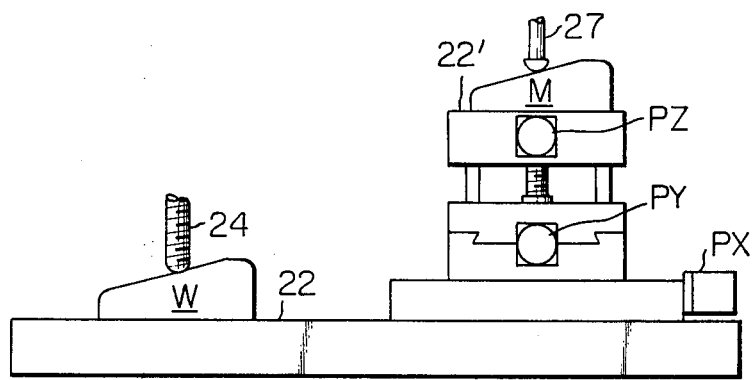
FIG. 3 illustrates part of the construction of the scale control device, according to a second embodiment.

FIG. 3 illustrates the outline of part of the construction of a second embodiment of the present invention. In the first embodiment described, in order to displace the tracer head 6 relative to the model M, the tracer head 6 is actuated by the pulse motors PX, PY and PZ. On the other hand, in the second embodiment, a second table 22', on which the model M is rested, is caused to displace with respect to the first table 22 on which the work W is rested, by means of the pulse motors PX, PY and PZ. Either embodiment brings about substantially the same result. The second embodiment, however, is discriminated from the first embodiment in the point that if the displacing direction of the model M by the pulse motors is the same as the displacing direction of the first table 22, the work W is machined to a shape larger than the model M, while if the displacing direction of the model M is reverse to that of the first table 22, the work W is machined to a shape smaller in size than the model M.

What we claim is:

1. In a profiling machine tool including a tracer head displaceable relative to a model; a tool head displaceable relative to a work; a stylus held by said tracer head and adapted to contact the model; a tool carried on said tool head and machining said work; and a profiling control device detecting the contact of said stylus with said model and controlling the position of said tool head relative to said work; a scale control device comprising:
    relative displacement detecting means for detecting a relative displacement and a displacing direction of said tool head with respect to said work and producing output signals including the data of both the relative displacement and moving direction;
    feedback signal producing means for receiving the output signals from said relative displacement detecting device and converting said output signals into feedback signals which have been frequency-divided at a preset desired ratio; and
    model drive mechanisms for displacing said model relative to said work in a direction the same as or reverse to a moving direction of said tool head with respect to the work, in response to said feedback signals and in proportion to a relative displacement of said tool head relative to said work.

2. In a profiling machine tool including a tracer head displaceable relative to a model; a tool head displaceable relative to a work; a stylus held by said tracer head and adapted to contact the model; a tool carried on said tool head and machining said work; and a profiling control means for detecting the contact of said stylus with the model and controlling the position of said tool head relative to said work; a scale control device comprising:
    a table for resting thereon said work and model;
    relative displacement detecting means for detecting a relative displacement and a moving direction of said table with respect to said tool head and producing output signals including the data of both relative displacement and the moving direction;
    feedback signal producing means for receiving the output signals from said relative displacement detecting devices and converting said output signals into feedback signals frequency-divided at a pre-set desired ratio; and
    tracer head drive mechanisms for displacing said tracer head relative to said tool head in a direction the same as or reverse to the moving direction of said tool head with respect to said table, in response to said feedback signals and in proportion to a relative movement of said tool head to the table.

3. In a profiling machine tool including a tracer head displaceable relative to a model; a tool head displaceable relative to a work; a stylus held on said tracer head and adapted to contact the model; a tool carried by said tool head and machining the work; and a profiling control means for detecting the contact of said stylus with the model and controlling the position of said tool head relative to said work; a scale control device comprising:
    a first table for resting thereon said work;
    a second table for resting said model thereon, said second table being relatively displaceable with respect to said first table;
    relative displacement detecting means for detecting a relative displacement and a displacing direction of said first table with respect to said tool head and producing output signals including the data of both the relative displacement and the moving direction thus detected;
    feedback signal producing means for receiving the output signals from said relative displacement detecting means and converting said output signals into feedback signals which have been frequency-divided at a pre-set desired ratio; and,
    a second table drive mechanism for displacing said second table relative to said first table in a direction the same as or reverse to a moving direction of said tool head with respect to said first table, in response to said feedback signals and in proportion to the displacement of said tool head relative to the table.

* * * * *